United States Patent [19]
Larson

[11] 3,879,014
[45] Apr. 22, 1975

[54] VEHICLE LEVELING DEVICE

[76] Inventor: William A. Larson, 1215 Paseo Dorado, Fullerton, Calif. 92635

[22] Filed: July 13, 1973

[21] Appl. No.: 379,188

[52] U.S. Cl.................................. 254/94; 254/124
[51] Int. Cl............................................. B66f 7/22
[58] Field of Search ....... 254/94, 88, 122, 104, 124; 248/352; 188/32

[56] References Cited
UNITED STATES PATENTS

| | | | |
|---|---|---|---|
| 829,205 | 8/1906 | Hampson | 254/94 |
| 1,778,521 | 10/1930 | Deal | 254/94 |
| 1,947,346 | 2/1934 | Lintern | 254/94 |
| 3,021,112 | 2/1962 | Forman | 254/104 |
| 3,074,512 | 1/1963 | Naur | 188/32 |
| 3,684,233 | 8/1972 | Vukich | 254/94 |

*Primary Examiner*—Al Lawrence Smith
*Assistant Examiner*—Robert C. Watson
*Attorney, Agent, or Firm*—Philip M. Hinderstein

[57] ABSTRACT

A leveling device for raising a wheel of a vehicle to effect leveling of the vehicle comprising a generally wedge shaped body having a narrow end and wide end and curved top and bottom surfaces, the top and bottom surfaces being curved in the same direction and having radii of curvature which are approximately equal and greater than the radius of the wheel, the device being adapted to be placed under the wheel of the vehicle for raising the same, the vehicle being driven onto the body, from the narrow end thereof, until the vehicle is level. According to one embodiment of the invention, the leveling device includes a jack mechanism for adjusting the spacing between the top and bottom surfaces of the body.

2 Claims, 6 Drawing Figures

VEHICLE LEVELING DEVICE

BACKGROUND OF THE INVENTION

1. Field of the Invention

The present invention relates to a vehicle leveling device and, more particularly, to a simple and efficient device for use with mobile homes, trailers, campers, and the like to permit the leveling thereof regardless of the local terrain.

2. Description of the Prior Art

It is well known that recreational vehicles, such as mobile homes, trailers, campers, and the like, must be leveled when stopped for any appreciable length of time such as when parked overnight or when camping. There are numerous reasons why this is the case. For example, it is uncomfortable to walk, sit, or sleep in a recreational vehicle which is not properly leveled. More importantly, however, most of the mechanical and electrical components of the recreational vehicle work improperly if the vehicle is not leveled.

For example, most gas refrigerators are constructed in a manner such that the proper operation thereof is critically dependent upon the refrigerator being approximately level. If the refrigerator is not level, ice cubes will melt and the food may possibly spoil. In the case of ice boxes, the water will not drain properly if the box is not level.

It is difficult to cook on a stove which is not perfectly level since the food being cooked will accumulate in a corner of a pot or pan. Doors and cabinets also won't work properly if the vehicle isn't level.

Because of this problem, most recreational vehicles include a bubble level or other level indicator to determine when the vehicle is level. However, the problem occurs in the mechanism or technique for actually leveling the vehicle.

The most common technique for leveling a vehicle is the use of hydraulic or hand pumps or jacks at the four corners of the vehicle which may be used to level the same. However, such pumps or jacks are expensive and are only found on the more expensive recreational vehicles. Furthermore, they must be operated from outside of the vehicle and two people are required, one to watch the level indicator in the vehicle and the other to operate the pumps or jacks, if a single individual is not to be faced with the problem of constantly running back and forth.

If the expensive pumps and jacks are unavailable for one reason or another, hand methods are devised for leveling the vehicle. One technique is to dig a hole under the high tire, but this obviously requires a great deal of physical exertion. Another technique is to use a piece of wood which is propped up at one end to form a wedge which the low tire may be driven onto to level the vehicle. However, there is a problem with any such wedge-shaped device in that once properly leveled, the tire is on a steep incline and it is difficult to stop the vehicle in the exact correct position and to keep it there after being stopped.

It is also known that it is difficult to jack up a recreational vehicle in order to change a tire, install snow chains, or for any other purpose. The obvious reason for this is that recreational vehicles are quite large and heavy and conventional jacks require a significant amount of physical exertion to elevate even the smallest camper or trailer.

SUMMARY OF THE INVENTION

In accordance with the present invention, there is provided a vehicle leveling device which solves these problems in a simple and convenient manner. The present vehicle leveling device permits a vehicle to be leveled entirely from the inside thereof and allows for exact leveling. The present device is adapted to be positioned under the low tire of a vehicle and has a varying height so that the tire can be raised by any desired amount to exactly level the vehicle. The shape of the present device is such that it is easy to get on and off of. Furthermore, once the vehicle is leveled, the present device is quite stable and there is no great tendency for the vehicle to be driven thereoff. The present device can be manufactured inexpensively and readily stored.

According to one embodiment of the invention, the height of the present leveling device is adjustable so that fine adjustments in the height of the vehicle may be made. In addition, this feature permits a vehicle to be jacked up in a simple manner without a great deal of physical exertion.

Briefly, the present vehicle raising device for raising a wheel of a vehicle to effect leveling of the vehicle comprises a generally wedge shaped body having a narrow end and wide end and curved top and bottom surfaces, the top and bottom surfaces being curved in the same direction and having radii of curvature which are approximately equal and greater than the radius of the wheel, the vehicle being driven onto the body, from the narrow end thereof, until it is level. Because of the curved top and bottom surfaces of the present leveling device, it rolls underneath the wheel and assumes a relatively stable position once the level position is reached.

According to one embodiment of the invention, the present vehicle leveling device includes a pair of legs pivotably connected to the sides thereof, one of the legs of each pair being connected adjacent the narrow end thereof and the other leg of each pair being connected adjacent the wide end thereof, such legs being adapted to contact the ground to stabilize the body when the vehicle is level.

According to another embodiment of the invention, the present vehicle leveling device includes a jack mechanism for adjusting the spacing between the top and bottom surfaces of the body. Thus, once the vehicle is positioned on the body, a block of wood or other suitable support may be placed under the vehicle axle so that the spacing between the top and bottom surfaces may be decreased and the body removed to permit access to the tire for any desired purpose.

OBJECTS

It is therefore an object of the present invention to provide a vehicle leveling device.

It is a further object of the present invention to provide a simple and efficient device for use with mobile homes, trailers, campers, and the like to permit the leveling thereof regardless of the local terrain.

It is a still further object of the present invention to provide a vehicle leveling device in which the vehicle may be leveled entirely from the inside thereof.

It is another object of the present invention to provide a vehicle leveling device in which fine adjustments may be made in order to accurately level the vehicle.

It is still another object of the present invention to provide a simple and efficient device for use in jacking up a vehicle.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

Figure 1:
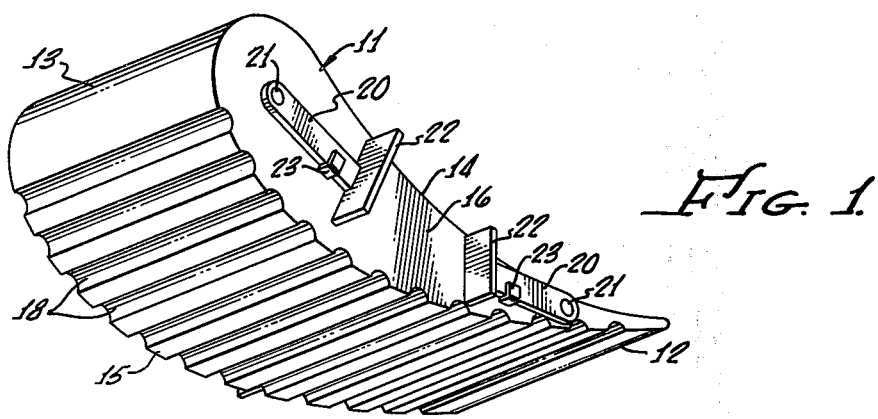
FIG. 1 is a perspective view of a first embodiment of the present vehicle leveling device.

Referring now to the drawings and, more particularly, to FIG. 1 thereof, there is shown a vehicle leveling device, generally designated 10, constructed in accordance with the teachings of the present invention. Vehicle leveling device 10 comprises a generally wedge-shaped body 11 having a narrow end 12 and a wide end 13, curved top and bottom surfaces 14 and 15, respectively, top and bottom surfaces 14 and 15 being curved in the same direction, and sides 16 and 17. The narrow end 12 of body 11 comes almost to a point but is rounded for ease of construction. The thickness or height of body 11 continues to increase until reaching wide end 13 which has a generally semicircular shape, as shown. The length of body 11 should be slightly greater than the diameter of the vehicle tire under which body 11 is to be positioned and the width of body 11 should be greater than the width of such vehicle tire.

According to the preferred embodiment of the present invention, the radius of curvature of top surface 14 is approximately equal to the radius of curvature of bottom surface 15. However, the centers of curvature are displaced so as to provide the wedge shape. It has been found that the preferred radius of curvature of both the top and bottom surfaces is approximately equal to one and one-half times the radius of curvature of the vehicle tire with which device 10 is to be used.

Bottom surface 15 of body 11 has a series of grooves 18 therein forming a tread to prevent slipping between bottom surface 15 and the ground, as will be explained more fully hereinafter.

Vehicle leveling device 10 may optionally include two pairs of identical legs 20 which are pivotably connected to sides 16 and 17 of body 11, in any suitable manner, such as by means of pins 21. One pair of legs 20 would be connected to sides 16 and 17 adjacent narrow end 12 of body 11 whereas the other pair of legs 20 would be connected to sides 16 and 17 adjacent wide end 13 of body 11. The unconnected ends of legs 20 may include feet or pads 22.

Where legs 20 are included, they must either be made removable from sides 16 and 17 of body 11 or leveling device 10 should include means for releasably maintaining legs 20 in contact with sides 16 and 17 of body while the vehicle is being driven thereon. According to the embodiment shown in FIG. 1, such means includes an L-shaped bracket or clip 23 so positioned on sides 16 and 17 that legs 20 rest in brackets 23 as shown in FIG. 1. However, legs 20 may be pivoted around pins 21 out of brackets 23 in use.

OPERATION

Figure 2:
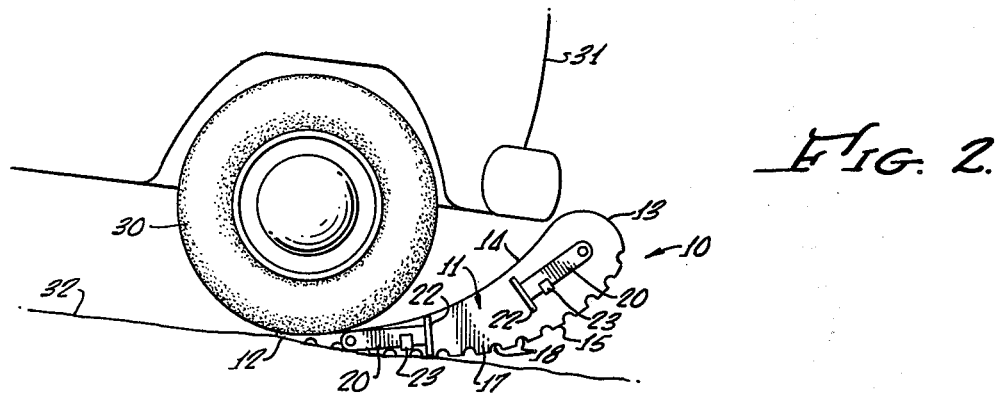
FIGS. 2–4 are a series of elevation views showing the use of the vehicle leveling device of FIG. 1 for elevating the low tire of a recreational vehicle.
Figure 3:
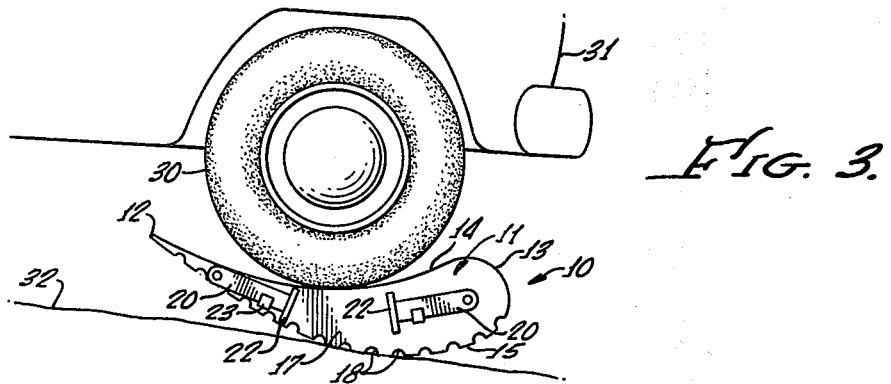
Figure 4:
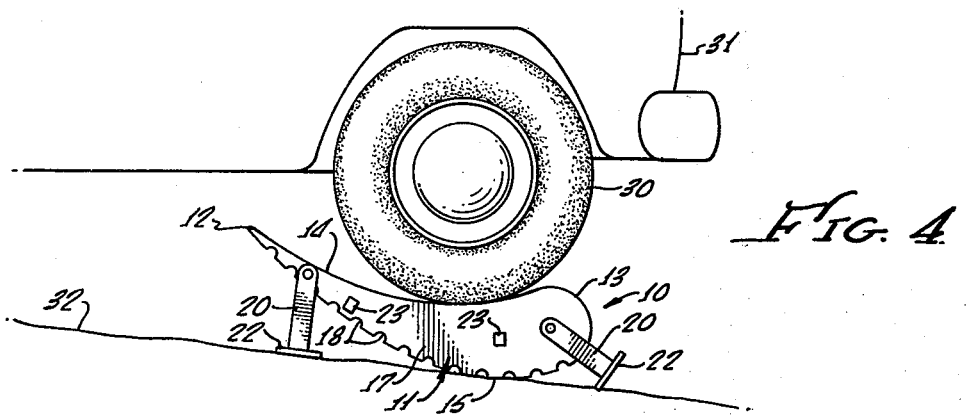

In operation, FIGS. 2–4 show the left rear tire 30 of a vehicle 31 which is resting on the ground on a slight incline so that vehicle 31 is unlevel, as shown in FIG. 2. Having determined that tire 30 is the low tire and that vehicle 31 can be leveled by elevating tire 30, device 10 is positioned in back of tire 30 with tire 30 parallel to sides 16 and 17 of body 11 and approximately centered with respect thereto. Narrow end 12 is wedged underneath tire 30 and arms 20 are positioned within brackets 23. This is essentially the position shown in FIG. 2 and the vehicle is now ready to be leveled.

The driver may then return to vehicle 31 and begin to back up vehicle 31 while watching the level indicator therein. As vehicle 31 moves backward, leveling device 10 rocks beneath tire 30 from the position shown in FIG. 2, through the position shown in FIG. 3, to the position shown in FIG. 4 where, presumably, vehicle 31 is now approximately level. Since top and bottom surfaces 14 and 15, respectively, are curved, body 11 rotates so that there is not a substantial angle, at any time, between the tangent point between tire 30 and top surface 14 and the tangent point between bottom surface 15 and ground 32. Thus, upon reaching the level position, vehicle 31 is relatively stable and it is relatively easy to immediately stop vehicle 31 and to lock it in this position.

The tread on the bottom surface 15 of body 11 prevents slipping between bottom surface 15 and ground 32. No tread is required in top surface 14 because tire 30 has a tread and this provides a sufficient frictional surface.

Once vehicle 31 reaches the level position, as shown in FIG. 4, legs 20 may be rotated around pins 21, out of brackets 23, until feet 22 contact ground 32. This helps support narrow and wide ends 12 and 13, respectively, of body 11 and adds to the stability of device 10. While legs 20 on both sides 16 and 17 of device 10 need not be used, both sides 16 and 17 would be provided with legs so that device 10 could be used on both sides of vehicle 31. Alternatively, legs 20 may be made removable and used on whichever side of body 11 is facing outwardly.

DESCRIPTION OF ALTERNATE EMBODIMENT

Figure 5:
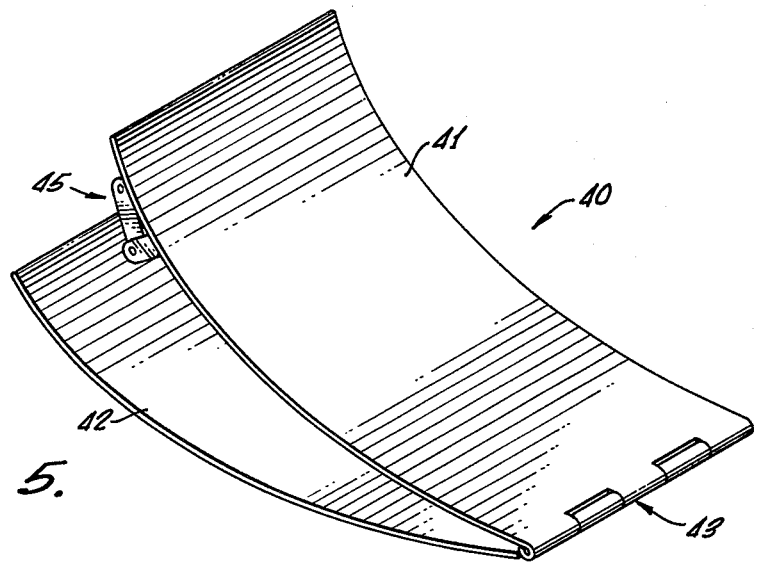
FIG. 5 is a perspective view of a second embodiment of the present vehicle leveling device.
Figure 6:
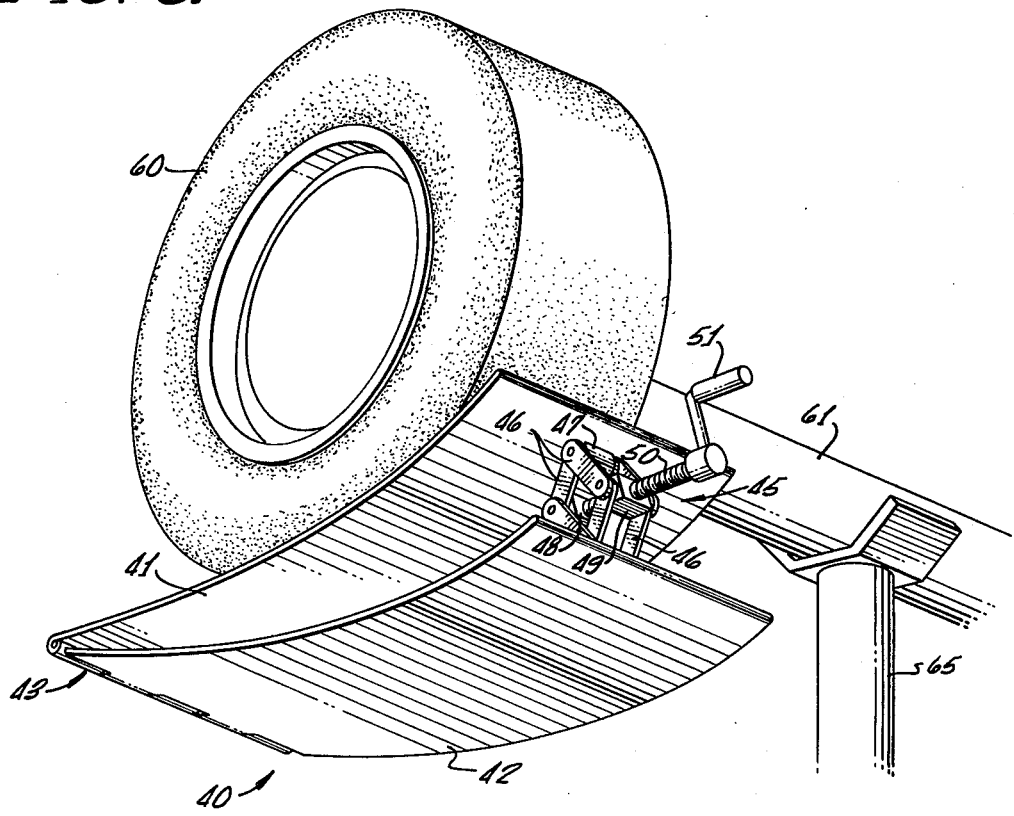
FIG. 6 is a perspective view showing the use of the vehicle leveling device of FIG. 5 for jacking up a vehicle.

Referring now to FIGS. 5 and 6, there is shown a vehicle leveling device, generally designated 40, constructed in accordance with the teachings of the present invention. Vehicle leveling device 40 comprises a pair of curved plates 41 and 42 which are curved in the same direction and have approximately equal radii of curvature. First ends of plates 41 and 42 include a hinge mechanism 43 for interconnecting such ends in a manner which will permit relative movement between plates 41 and 42. Thus, by interconnecting first ends of plates 41 and 42 with hinge mechanism 43, there is provided a body having a narrow end and a wide end and curved top and bottom surfaces which has the same general appearance as leveling device 10 of FIGS. 1-4. In fact, the lengths and widths of plates 41 and 42 would be approximately equal to the lengths and widths of surfaces 14 and 15, respectively, of leveling device 10.

Leveling device 40 also includes a jack mechanism, generally designated 45, for interconnecting the other ends of plates 41 and 42, to hold such ends in mutually spaced relationship, and to permit the adjustment of such spacing. Jack mechanism 45 may be any known type of jack mechanism, one convenient type being shown in FIG. 6. More specifically, jack mechanism 45 may include two parallel, interconnected sets of arms 46, each set including four arms interconnected by pins in a generally rectangular configuration. A first corner 47 of each set of arms 46 is connected to upper plate 41 whereas the opposite corners are connected to lower plate 42. The remaining two corners 48 and 49 of each set of arms 46 are connected to terminal blocks which receive a threaded shaft 50 having a crank mechanism 51 connected to one end thereof. In this manner, rotation of crank mechanism 51 and shaft 50 adjusts the relative spacing between corners 48 and 49 of the two sets of arms 46, thereby adjusting the spacing between the other two corners of the sets of arms and the spacing between plates 41 and 42.

The bottom surface of plate 42 may have a series of grooves therein (not shown) or any other means for forming a tread so as to prevent slipping between such surface and the ground.

OPERATION

In operation, FIG. 6 shows the left rear tire 60 and rear axle 61 of a vehicle (not shown). FIG. 6 shows tire 60 positioned on vehicle leveling device 40, tire 60 having reached this position in the same manner described previously with regard to FIGS. 2-4. However, with jack mechanism 45 included, vehicle leveling device 40 is capable of providing a wider variety of results than that obtainable with vehicle leveling device 10.

More specifically, after the vehicle has been leveled and in use for a period of time, it may become apparent that the vehicle is slightly out of level, either because of settling of the ground beneath leveling device 40, because of a shift of weight in the vehicle, or because the vehicle was not originally leveled accurately. With vehicle leveling device 40, rather than returning to the vehicle and relocating its position, a slight adjustment in the spacing between plates 41 and 42 may be achieved by use of jack mechanism 45.

Alternatively, leveling device 40 may be used to jack up a vehicle to change a tire, to install snow chains, or for any other purpose. For example, the vehicle may be driven onto leveling device 40 in the same manner as described previously with respect to FIGS. 2-4. Once in place, a block of wood or any other suitable support device, generally indicated at 65 in FIG. 6, may be placed beneath axle 61. Jack mechanism 45 may then be manipulated to decrease the spacing between plates 41 and 42, permitting the removal of device 40 from beneath tire 60. Thus, at this time, tire 60 may be changed or snow chains may be conveniently installed. Once this has been accomplished, leveling device 40 may be replaced beneath tire 60 and jack mechanism 45 manipulated to a point sufficient to elevate axle 61 off of support 65.

It can therefore be seen that in accordance with the present invention, there is provided a vehicle leveling device 10 which solves the problems of leveling a recreational vehicle 31 in a simple and convenient manner. Leveling device 10 permits vehicle 31 to be leveled entirely from the inside thereof and allows for exacting leveling. Device 10 is adapted to be positioned under the low tire 30 of vehicle 31 and has a varying height so that tire 30 can be raised by any desired amount to exactly level vehicle 31. The shape of device 10 is such that it is easy to get on and off of. Furthermore, once vehicle 31 is leveled, device 10 is quite stable and there is no great tendency for vehicle 31 to be driven thereoff. Legs 20 add to this stability.

In accordance with the embodiment of the invention shown in FIGS. 5-6, the height of leveling device 40 is adjustable so that fine adjustments in the height of a vehicle may be made. In addition, this feature permits a vehicle to be jacked up in a simple manner without a great deal of physical exertion.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A leveling device for raising a wheel of a vehicle to effect leveling of the vehicle comprising:
    a generally wedge-shaped body having a narrow end and a wide end and curved top and bottom surfaces, said top and bottom surfaces being curved in the same direction and having approximately equal radii of curvature, said body comprising:
    a pair of curved plates forming said top and bottom surfaces, respectively; and
    hinge means for interconnecting first ends of said plates for relative pivotal movement; and
    a jack mechanism interconnecting the other ends of said plates for adjusting the spacing therebetween, said jack mechanism comprising:
    at least one set of four, pivotably interconnected arms arranged in a generally rectangular configuration, opposite corners of said set being connected to respective ones of said other ends of said plates; and
    a crank mechanism connected to the remaining opposite corners of said set for adjusting the spacing therebetween.

2. A vehicle leveling device according to claim 1 wherein said jack mechanism further comprises:
    a second set of four, pivotably interconnected arms arranged in a generally rectangular configuration in spaced, parallel relationship relative to said first-mentioned set of arms, opposite corners of said second set being connected to respective ones of said other ends of said plates; and
    a pair of terminal blocks connected between respective ones of the remaining opposite corners of said sets, said crank mechanism being connected to said sets, said crank mechanism being connected to said terminal blocks to adjust the spacing therebetween and thereby simultaneously to adjust the spacing between said remaining opposite corners of said first and second sets of arms.

* * * * *